United States Patent [19]

Parr

[11] Patent Number: 4,941,670
[45] Date of Patent: Jul. 17, 1990

[54] RIDE-ON DEVICE FOR TRANSPORTATION AND STUNT RIDING

[76] Inventor: David A. Parr, 1 Nattai Close, Thornleigh NSW, Australia

[21] Appl. No.: 242,396

[22] Filed: Sep. 9, 1988

[30] Foreign Application Priority Data

Sep. 10, 1987 [AU] Australia ............................ PI4318

[51] Int. Cl.⁵ .............................................. B62D 7/00
[52] U.S. Cl. .............................. 280/87.021; 280/11.2; 188/5; D21/71; D21/81
[58] Field of Search .................. 280/87.021, 87.041, 280/87.042, 11.2, 218, 266, 87.043, 23.1, 28.14; D21/71, 76, 81, 224, 227; 188/5

[56] References Cited

U.S. PATENT DOCUMENTS

| | | | |
|---|---|---|---|
| D. 71,011 | 9/1926 | Fageol | D21/71 |
| D. 145,513 | 9/1946 | Dodegge | D21/71 |
| D. 199,682 | 12/1964 | Jezowski | D21/81 |
| D. 304,360 | 10/1989 | Curry | D21/81 |
| 1,620,939 | 3/1927 | Behm | 280/87.021 X |
| 1,646,606 | 10/1927 | Wilson | 280/87.021 X |
| 1,838,877 | 12/1931 | Stevens | 280/87.041 X |
| 2,027,254 | 1/1936 | Vogt | 280/87.041 X |
| 2,418,368 | 4/1947 | Schroeder | 280/218 |
| 2,522,744 | 9/1950 | Budd | 280/87.021 X |
| 2,900,008 | 8/1959 | Seger | 280/23.1 X |
| 3,751,062 | 8/1973 | White, Sr. | 280/87.402 |
| 3,773,354 | 11/1973 | Morrison et al. | 280/218 |
| 4,068,858 | 1/1978 | Harrison et al. | 280/288.4 |
| 4,168,076 | 9/1979 | Johnson | 280/11.2 |

FOREIGN PATENT DOCUMENTS

| | | | |
|---|---|---|---|
| 860069 | 1/1971 | Canada | 280/87.041 |
| 3442193 | 11/1985 | Fed. Rep. of Germany | 280/87.042 |
| 75255 | 6/1949 | Norway | 280/23.1 |

Primary Examiner—Charles A. Marmor
Assistant Examiner—Brian L. Johnson
Attorney, Agent, or Firm—Townsend & Townsend

[57] ABSTRACT

A lightweight, easily stored, portable, strong, ride-on-device (1) for transportation and stunt riding. The device is usable on a supporting surface and includes a V-shaped frame (2) on which is mounted an upper and lower body stabilization and support. At least two wheels (6a, 6b, 7a, 7b) are rotatably attached to each of two wheel mountings such that in use, the device may be propelled by potential and/or kinetic energy. The direction of travel of the device is governed by the non-perpendicular positioning of the frame relative to the supporting surface. The device further includes a braking device (8).

11 Claims, 4 Drawing Sheets

RIDE-ON DEVICE FOR TRANSPORTATION AND STUNT RIDING

The present invention relates to a ride-on device for transportation and stunt riding which is lightweight, easily stored, portable, yet strong enough to withstand the rigours of stunt riding.

Devices in the market currently directed towards transportation and stunt riding may be categorised generally as either push-bikes or skateboards.

In consideration of these categories with respect to the riders of these devices, push-bikes and skateboards offer distinctly different riding characteristics.

Push-bikes on the one hand are maneuvered by the hands and body weight distribution and basically balanced through the gyroscopic effect of the rotating wheels, have a seat for upper body support and means by which the push-bike may be powered. The result is a device particularly suitable for transporting the rider from one place to another while also allowing the rider to conduct stunt riding where upper body control is required.

Skateboards on the other hand are maneuvered and balanced by foot manipulation and body weight distribution and are powered by either harnessing the potential energy of a hill or the kinetic energy of the rider in a manner similar to that used to propel a 'scooter'. The result in this case is a device particularly suitable for stunt riding, while also offering the rider a means of transportation over short distances yet being portable over longer distances and terrain not suitable for skateboard riding.

It can be seen therefore that each category has advantages and disadvantages over the other and as such it is the intention of the present invention to combine the advantages of each category to produce a new and useful means of transportation offering freedom, portability, upper body support etc., which is readily adaptable to stunt riding.

It is therefore the intention of the present invention to provide a transportation and stunt riding device adapted for use on a supporting surface, comprising a frame on which is mounted upper and lower body stabilization and support means, and at least two wheel mounting means, rotatably attached to said at least two wheel mounting means being at least four wheels such that in use, the device may be propelled by potential and/or kinetic energy, the direction of travel of said device being governed by the non-perpendicular positioning of the frame relative to the supporting surface. Preferably, the device further comprises a braking means.

A preferred embodiment of the present invention will now be described with reference to the accompanying drawings wherein.

Figure 1:
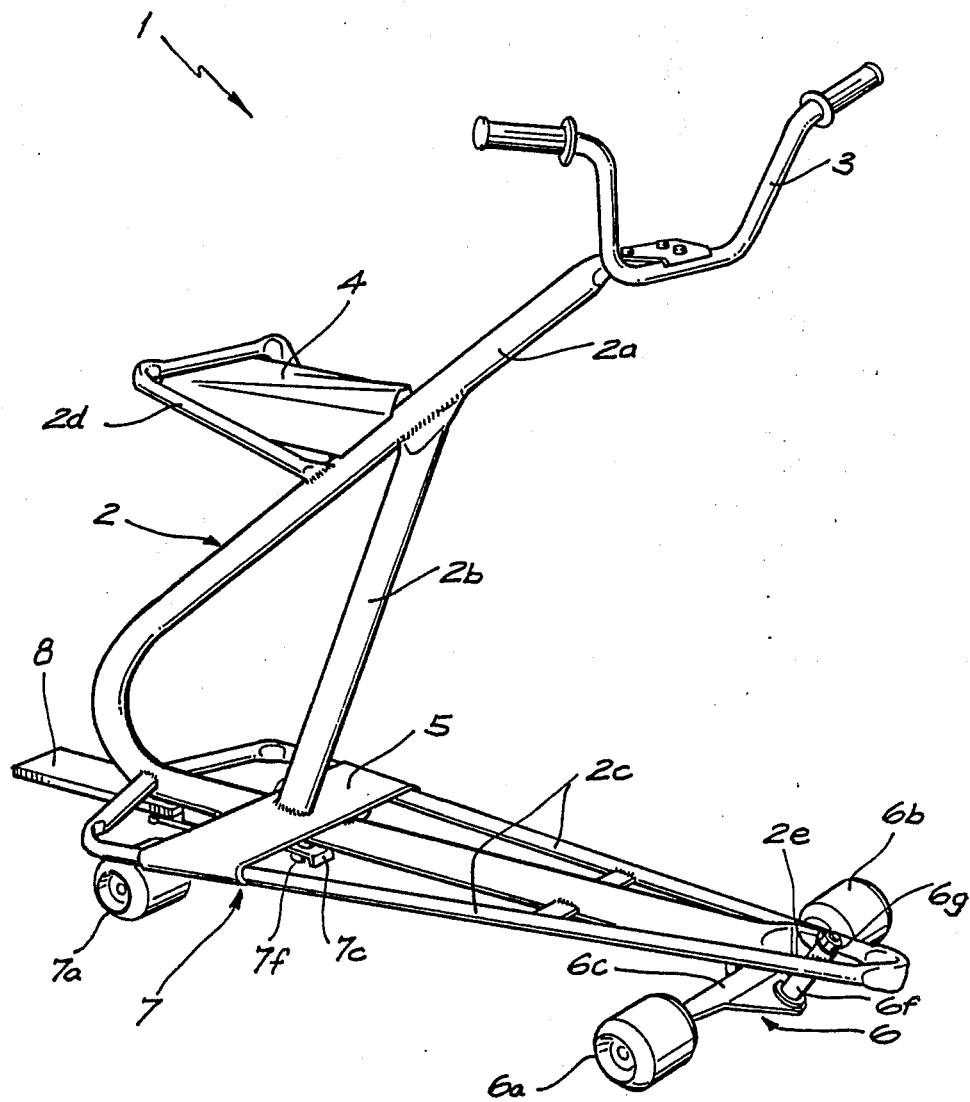
FIG. 1 Shows a perspective view of preferred embodiment.
Figure 2:
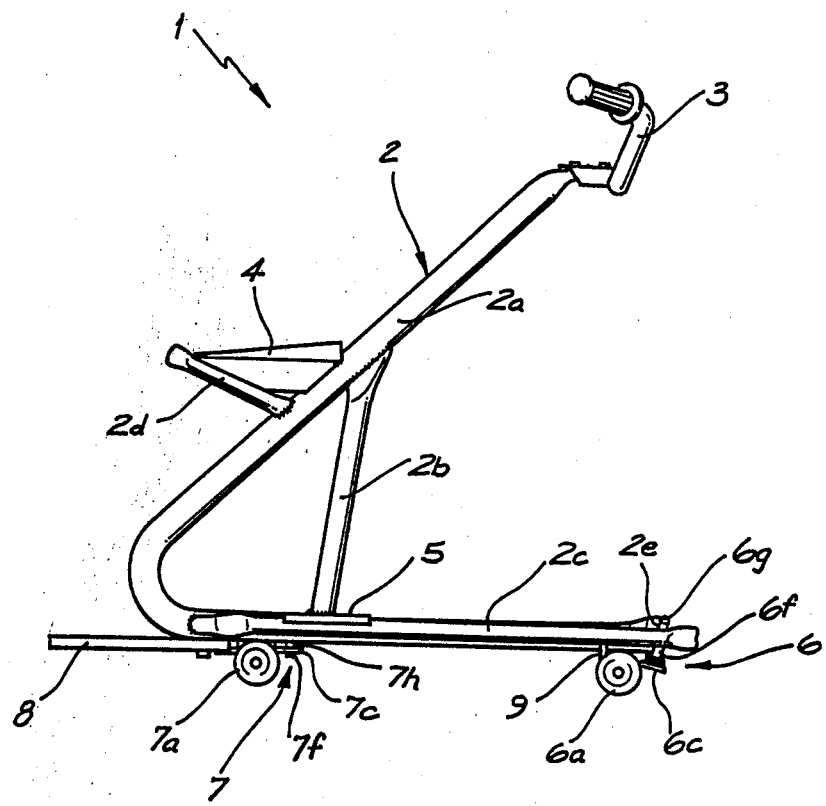
FIG. 2 Shows a side view of a preferred embodiment.
Figure 3:
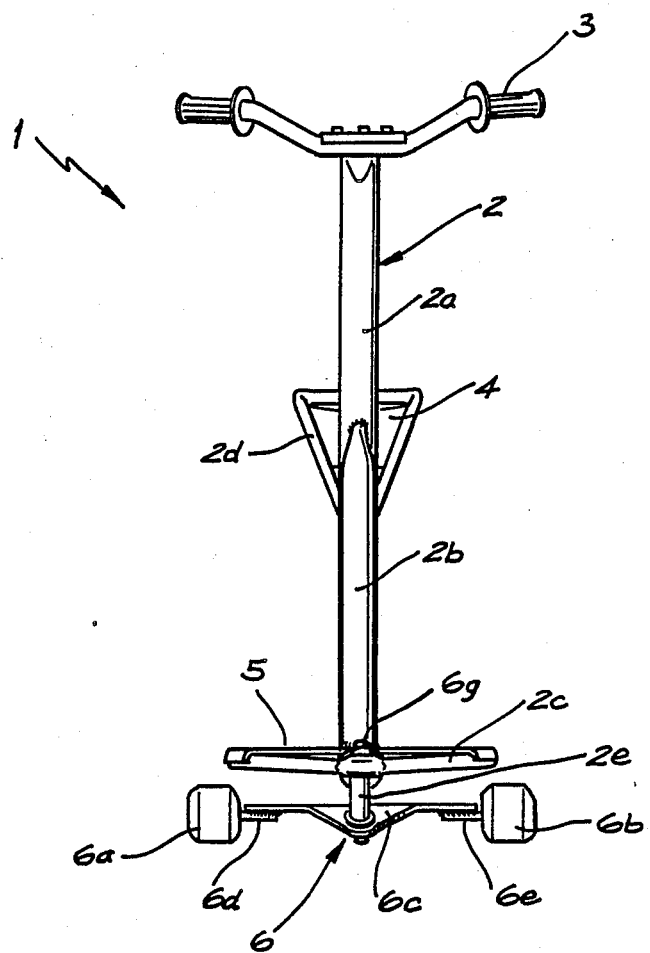
FIG. 3 Shows a front view of the embodiment of FIG. 1.
Figure 4:
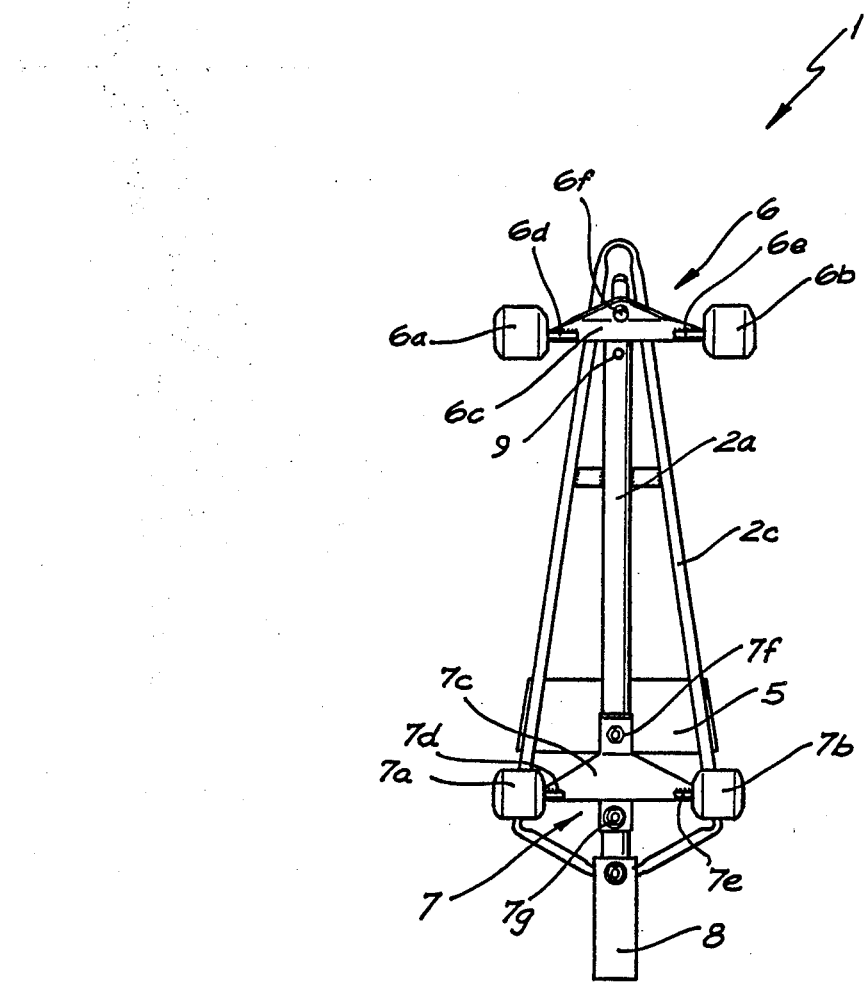
FIG. 4 Shows a bottom view of the embodiment of FIG. 1.

The device (1) comprises a frame (2), handle bars (3), seat (4), foot rest (5), front bogie (6), near bogie (7) and braking means (8).

The frame (2) is further comprises of a main member (2a) preferably formed as a single V-shaped member from hollow steel tube, and stengthened by cross member (2b) also preferably of hollow steel tube and securely fixed between the arms of the V-shaped main member. Alternatively the apex of the V-shaped member may be formed so as to allow resilient movement of the arms of the V in relation to each other. The main member may be constructed in several pieces to reduce package size.

Attached to the main member (2a) and forming an integral part of the frame (2) are a foot rest support frame (2c) and seat support frame (2d). Frames (2c) and (2d) are also preferably formed from hollow steel tube and preferably welded to the main member (2a).

Further mounted on the main member (2a) are handle bars (3), front bogie (6), rear bogie (7) annd braking means (8). These items are preferably mounted by the use of mechanical fasteners such as nuts, bolts and washers although other methods of attachment may be used.

In a further embodiment, the handle bars (3) may be releasably attached to the main member (2a) so as to allow the handle bars (3) to be rotated into planar relationship with the frame (2a) in longitudinally horizontal or vertical alignment therewith thus facilitating easy storage of the device (1) in confined spaces as seen in phantom lines in FIG. 1. Such a mechanism which would allow this type of action may be a combined lift and rotate mechanism however, other mechanisms may be successfully utilized.

The seat (4) may be either permanently or removably attached to the main member (2a) and seat support frame (2d) and may be of any material. In the preferred embodiment however, the seat would be moulded of metal and welded to the main member (2a) and seat support frame (2d).

The braking means (8) may be preferably of a resilient material such as rubber which offers a high co-efficient of friction with respect to a broad spectrum of surfacing materials over which the device (1) may travel. As can best be seen in FIG. 1 the braking device (8) may be attached so as to expose a trailing portion behind the device (1) of sufficient length to allow the rider to engage the surface over which the device (1) is travelling with the braking means (8) without the foot of the rider directly engaging the travelled surface, thus causing the device to slow and ultimately stop.

The front bogie (6) is comprised of two wheels (6a) and (6b) rotatably connected to a front bogie plate (6c) by stub axles (6d) and (6e). A single axle may also be used. The front bogie plate (6c) is in turn pivotally connected to the frame (2) by way of a third stub axle (6f) which passes through a sleeve (2e) attached to and forming an integral part of the frame (2). The sleeve may also be relocatably attached to said frame. The third stub axle (6f) is rotatably held in position through the sleeve (2e) by way of mechanical fasteners (6g) such as nuts and washers. Attachment of the front bogie (6) to the frame (2) in this manner allows the front bogie (6) to rotate about the axis described by the third stub axle (6f) allowing the device (1) to be maneuvered by the rider. The third stub axle (6f) is preferably angled rearwardly between 30° and 89° below the longitudinal axis of the frame to facilitate stability in motion.

To prevent the front bogie (6) from rotating to an angle that would cause wheels (6a) and (6b) to 'lock up', a bogie rotation stop (9) is preferably attached to the frame (2) to prevent the front bogie (6) from rotating beyond a safe angle for turning. However, other means of restricting front bogie rotation such as the attachment of bogie rotation stops to the bogie itself may be employed.

The rear bogie (7) is comprised of two wheels (7a) and (7b) rotatably connected to a rear bogie plate (7c) by stub axles (7d) and (7e). A single axle may also be used. The rear bogie plate (7c) is in turn connected to the frame (2) by way of mechanical fasteners (7f) and (7g) and a bracket (7h). At least one resilient member (7j) is incorporated in communication with the rear bogie plate such that the rear bogie (7) may move relative to the frame (2) whilst maintaining a substantially perpendicular orientation between the axis of the wheels (7a) and (7b) and the longitudinal axis of the lower member of main member (2a) of the frame (2).

To ride the device (1) the rider may either carry the device (1) simply over one shoulder to the top of the hill, place their feet on the foot rest (5), their hands on the handle bars (3) and sit on the seat (4) thus harnessing the potential energy of the hill or place one foot on the foot rest (5), their hands on the handle bars (3) and in either a standing or sitting position tap the kinetic energy generated by the free foot of the rider in manner not unlike that used to propel a 'scooter'.

To turn the device (1) the rider simply alters the center of gravity of the device (1) by leaning to one side or the other or alternatively leaning the device to one side or the other whilst the rider maintains a substantially vertical posture. The change in the center of gravity causes the frame (2) to lean to the side the rider is leaning, or the frame has been pushed, in turn causing the front bogie (6) to rotate about the third stub axle (6f), re-aligning the axis of the wheels (6a and 6b) relative to the longitudinal axis of the frame. This changes the direction of travel of the device.

It should be noted that the rear bogie (7) does not alter orientation with respect to the frame (2) when the center of gravity is altered but instead works to oppose the sideways overturning moment generated by the altered center of gravity thus affecting a sideways stability of the device (1).

To stop or slow the device (1) the rider may from either in a standing or sitting position simply apply a downwards force upon the braking means (8), bringing the braking means (8) into frictional contact with the surface over which the device (1) is travelling and subsequently slow or stop the forward motion of the device (1).

The preceding is a description of a preferred embodiment of the present invention and the best method known of performing same. It is not intended however to restrict the scope or spirit of the present invention to the preferred embodiment as those skilled in the art will appreciate that modifications and alterations can be made to the present invention as described. The scope of the present invention is indicated by the appended claims rather than the foregoing description, and all changes which come within the meaning and range of equivalency of the claims are therefore intended to be embraced therein.

I claim:

1. A transportation and stunt riding device adapted for use on a supporting surface comprising:
    a V-shaped frame having a first arm and a second arm and a longitudinal axis, said first arm and said second arm being fixed with respect to each other;
    upper and lower body stabilization and support means mounted on said frame;
    at least two wheel mounting means mounted to said frame and having at least four wheels rotatably attached to said at least two wheel mounting means adapted to be powered by at least one of potential and kinetic energy, the direction of travel of said device being governed by the non-perpendicular positioning of the frames relative to the supporting surface;
    wherein one of said wheel mounting means includes front wheel mounting means defined by a first plate pivotally connected to the second arm of the V-shaped member by a stub axle integrally mounted on the first plate and passing through sleeve attached to the second arm of the V-shaped member, at least one wheel engaging axle permanently affixed to said first plate.

2. The device according to claim 1 further comprising braking means for braking at least one said wheel.

3. The device according to claim 1 wherein the apex of the V-shaped member allows resilient movement of the arms of said V-shaped member with relation to each other.

4. The device according to claim 1 wherein the upper body stabilization and support means comprise handle bars mounted perpendicularly to the longitudinal axis of said device at an upper end of the first arm of the V-shaped member.

5. The device according to claim 4 further comprising means for rotatably mounting said handle bars on the frame through ninety degrees and in one position substantially aligned and coplanar with the longitudinal axis of the device, in another position substantially perpendicular to the longitudinal axis of the device, to facilitate storage.

6. The device according to claim 1 wherein the lower body stabilization and support means are defined by a seat mounted on the first arm of the V-shaped member intermediate an upper end of the first arm of the V-shaped member and the apex of the V-shaped member, and foot support means mounted on the second arm of the V-shaped member.

7. The device according to claim 6 wherein the seat is affixed to the first arm of the V.

8. The device according to claim 1 wherein rear wheel mounting means are defined by a second plate connected to the second arm of the V-shaped member by a bracket and mechanical fasteners, said mechanical fasteners passing the second plate and attaching said second plate to the bracket, said bracket being affixed to the second arm of the V-shaped member, resilient spacing members being located so as to allow angular displacement of the first second plate relative to the bracket whilst maintaining a substantially perpendicular orientation between the axis of the wheels and the longitudinal axis of said second arm, and at least one wheel engaging axle being permanently affixed to the second plate.

9. The device according to claim 1 wherein an angle defines the non-perpendicular positioning of the frame relative to the supporting surface, such adjustment of said angle causing the second plate to rotate about an axis substantially parallel to the longitudinal axis of the device and the second plate to rotate about an axis defined by the axis of the stub axle passing through the sleeve attached to the frame, a change on the center of gravity of the device and second plate creating an overturning moment such that the second plate and attached wheels oppose said overturning moments and the first plate and attached wheels rotate to change the direction of travel of the device.

10. The device according to claim 1 wherein the lower end of the sleeve is configured rearward of the upper end of the sleeve such that an included angle between a longitudinal axis of the sleeve and the longitudinal axis of the device is between 30° and 89°.

11. A transportation and stunt riding device adapted for use on a supporting surface comprising:
- a V-shaped frame member having a first arm and a second arm fixed with respect to each other;
- upper and lower body stabilization and support means mounted on said frame;
- at least two wheel mounting means mounted to said frame having at least four wheels rotatably attached to said at least two wheel mounting means adapted to be powered by at least one of potential and kinetic energy, the direction of travel of said device being governed by the non-perpendicular positioning of the frame relative to the supporting surface;
- braking means including a resilient pad extending longitudinally rearward from the second arm of the V-shaped member adapted to engage the supporting surface over which the device travels, thereby braking the wheels by the application of a downward force to the pad, thus causing the device to lose energy through frictional contact between the pad and the supporting surface over which the device is travelling.

* * * * *